(12) United States Patent
Xie et al.

(10) Patent No.: US 11,010,929 B2
(45) Date of Patent: May 18, 2021

(54) IMAGE COMPRESSION WITH BOUNDED DEEP NEURAL NETWORK PERCEPTION LOSS

(71) Applicant: Hewlett Packard Enterprise Development LP, Houston, TX (US)

(72) Inventors: Xiufeng Xie, Palo Alto, CA (US); Kyu-Han Kim, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 121 days.

(21) Appl. No.: 16/526,335

(22) Filed: Jul. 30, 2019

(65) Prior Publication Data

US 2021/0035330 A1   Feb. 4, 2021

(51) Int. Cl.
  *G06T 9/00* (2006.01)
  *G06F 17/14* (2006.01)
  *G06N 5/04* (2006.01)
  *G06N 3/04* (2006.01)

(52) U.S. Cl.
  CPC ............ *G06T 9/002* (2013.01); *G06F 17/147* (2013.01); *G06N 3/04* (2013.01); *G06N 5/04* (2013.01)

(58) Field of Classification Search
  CPC ......... G06T 9/002; G06F 17/147; G06N 3/04; G06N 5/04
  See application file for complete search history.

(56) References Cited

U.S. PATENT DOCUMENTS

| | | |
|---|---|---|
| 2019/0042955 A1 | 2/2019 | Cahill et al. |
| 2019/0043201 A1* | 2/2019 | Strong ............... G06K 9/00624 |
| 2019/0044918 A1 | 2/2019 | Doshi et al. |
| 2019/0073582 A1* | 3/2019 | Yang ..................... G06F 17/11 |
| 2019/0156246 A1 | 5/2019 | Kuo et al. |
| 2020/0159961 A1* | 5/2020 | Smith ..................... G06T 7/70 |

OTHER PUBLICATIONS

Jiang, et al, "DCT-CNN-based classification method for the Gongbi and Xieyi techniques of Chinese ink-wash paintings", 2018 (Year: 2018).*
Chinchali, S.P. et al., Neural Networks Meet Physical Networks: Distributed Inference Between Edge Devices and the Cloud, (Research Paper), Proceedings of the 17th ACM Workshop on Hot Topics in Networks, Nov. 15-16, 2018, pp. 50-56.

(Continued)

*Primary Examiner* — Ruiping Li
(74) *Attorney, Agent, or Firm* — Hewlett Packard Enterprise Patent Department (57) ABSTRACT

Example method includes: transmit a plurality of probe images from an Internet of Things (IoT) device at an edge network to a server hosting a target deep neural network (DNN), wherein the plurality of images are injected with a limited amount of noise; receive a feedback comprising a plurality of discrete cosine transform (DCT) coefficients from the server hosting the target DNN, wherein the plurality of DCT coefficients are unique to the target DNN; generate a quantization table based on the feedback received from the server hosting the target DNN; compress a set of real-time images using the generated quantization table by the IoT device at the edge network; and transmit the compressed set of real-time images to the server hosting the target DNN for DNN inferences.

20 Claims, 5 Drawing Sheets

(56) References Cited

OTHER PUBLICATIONS

Kang, J. et al., Offloading and Transmission Strategies for IoT Edge Devices and Networks, (Research Paper), Journal Sensors, Feb. 18, 2019, vol. 19, 17 Pgs.

Ko, J.H. et al., Edge-host Partitioning of Deep Neural Networks with Feature Space Encoding for Resource-constrained Internet-of-things Platforms, (Research Paper), Feb. 11, 2018, 7 Pgs.

Liu, Z. et al., Feature Distillation: DNN-oriented Jpeg Compression Against Adversarial Examples, (Research Paper), 2019 Conference on Computer Vision and Pattern Recognition (CVPR 2019), Apr. 16, 2019, 9 Pgs.

Agustsson et al., "Generative Adversarial Networks for Extreme Learned Image Compression", Apr. 9, 2018, pp. 1-27.

Athalye et al., "Synthesizing Robust Adversarial Examples", Jun. 7, 2018, 19 pages.

Carlini et al., "Adversarial Examples are Not Easily Detected: Bypassing Ten Detection Methods", AISec'17, Nov. 3, 2017, pp. 3-14.

Cavigelli et al., "CAS-CNN: A Deep Convolutional Neural Network for Image Compression Artifact Suppression", In 2017 International Joint Conference on Neural Networks (IJCNN). IEEE, Nov. 22, 2016, 8 pages.

Cordts et al., "The Cityscapes Dataset for Semantic Urban Scene Understanding", The Cityscapes Dataset for Semantic Urban Scene Understanding, Apr. 7, 2016, pp. 1-11.

Courbariaux et al., "Binarized Neural Networks: Training Neural Networks with Weights and Activations Constrained to +1 or −1", Mar. 17, 2016, 11 pages.

Courbariaux et al., "BinaryConnect: Training Deep Neural Networks with binary weights during Propagations", Apr. 18, 2016, pp. 1-9.

Deng et al., "ImageNet: a Large-Scale Hierarchical Image Database", Proceedings / CVPR, IEEE Computer Society Conference on Computer Vision and Pattern Recognition. IEEE Computer Society Conference on Computer Vision and Pattern Recognition, Jun. 2009, 9 pages.

Fairman et al., "How the CIE 1931 Color-Matching Functions Were Derived from Wright-Guild Data", vol. 22, No. 1, 7 John Wiley & Sons, Inc., Feb. 1997, pp. 11-23.

Github, "Dilated Residual Networks", available online at <https://web.archive.org/web/20170925073855/https://github.com/fyu/drn>, Sep. 25, 2017, 4 pages.

Goodfellow et al., "Explaining and Harnessing Adversarial Examples", Published as a conference paper at ICLR 2015, Mar. 20, 2015, pp. 1-11.

Goodfellow et al., "Generative Adversarial Nets", NIPS'14: Proceedings of the 27th International Conference on Neural Information Processing Systems, vol. 2, Dec. 2014, pp. 1-9.

Google Cloud, "Edge TPU BETA", available online at <https://web.archive.org/web/20190724011847/https://cloud.google.com/edge-tpu/>, Jul. 24, 2019, 6 pages.

Guo et al., "Dynamic Network Surgery for Efficient DNNs", Nov. 10, 2016, 9 pages.

He et al., "Deep Residual Learning for Image Recognition", 2016 IEEE Conference on Computer Vision and Pattern Recognition (CVPR), 2016, pp. 770-778.

Hewlett Packard Enterprise, "Delivering Accelerated Video Analytics at the Edge for AI Cities", Technical white paper, 2017, pp. 1-13.

Hubara et al., "Binarized Neural Networks", 30th Conference on Neural Information Processing Systems (NIPS 2016), 2016, pp. 1-9.

Hubara et al., "Quantized Neural Networks: Training Neural Networks with Low Precision Weights and Activations", Sep. 22, 2016, pp. 1-29.

Iandola et al., "Squeezenet: Alexnet-Level Accuracy With 50X Fewer Parameters and <0.5MB Model Size", ICLR 2017, Nov. 4, 2016, pp. 1-14.

ITUR Rec, "BT.601-5: Studio Encoding Parameters of Digital Television for Standard 4: 3 and Wide-screen 16: 9 Aspect Ratios", 1995, pp. 1-16.

Jiang et al., "An End-to-End Compression Framework Based on Convolutional Neural Networks", Submitted to IEEE Transactions on Circuits and Systems for Video Technology, Aug. 2, 2017, pp. 1-13.

Johnson et al., "Perceptual Losses for Real-Time Style Transfer and Super-Resolution", Mar. 27, 2016, pp. 1-18.

Krizhevsky et al., "ImageNet Classification with Deep Convolutional Neural Networks", 2012, pp. 1-9.

Kurakin et al., "Adversarial Examples in the Physical World", Workshop track—ICLR 2017, Feb. 11, 2017, pp. 1-14.

Ledig et al., "Photo-Realistic Single Image Super-Resolution Using a Generative Adversarial Network", In Proceedings of the IEEE conference on computer vision and pattern recognition, May 25, 2017, pp. 1-19.

Li et al., "Ternary Weight Networks", 30th Conference on Neural Information Processing Systems (NIPS 2016), Nov. 19, 2016, pp. 1-5.

Liu et al., "DeepN-JPEG: A Deep Neural Network Favorable JPEG-based Image Compression Framework", In Proceedings of the 55th Annual Design Automation Conference, 2018, pp. 1-6.

Liu et al., "Delving Into Transferable Adversarial Examples and Black-Box Attacks", Feb. 7, 2017, pp. 1-24.

Mentzer et al., "Conditional Probability Models for Deep Image Compression", In Proceedings of the IEEE Conference on Computer Vision and Pattern Recognition, Jun. 4, 2019, pp. 1-19.

Microsoft Azure, "Azure IoT Edge", available online at <https://web.archive.org/web/20190504014615/https://azure.microsoft.com/en-in/services/iot-edge/>, May 4, 2019, 13 pages.

NVIDIA® Jetson™, "Embedded Systems for Next-Generation Autonomous Machines", available online at <https://web.archive.org/web/20190724095742/https://www.nvidia.com/en-us/autonomous-machines/embedded-systems/>, Jul. 24, 2019, 6 pages.

Rastegari et al., "Xnor-net: Imagenet Classification using Binary Convolutional Neural Networks", Aug. 2, 2016, pp. 1-17.

Simonyan et al., "Very Deep Convolutional Networks for Large-Scale Image Recognition", Published as a conference paper at ICLR 2015, Apr. 10, 2015, pp. 1-14.

Su et al., "One Pixel Attack for Fooling Deep Neural Network", IEEE Transactions on Evolutionary Computation, Oct. 17, 2019, pp. 1-15.

Wallace et al., "The JPEG still Picture Compression Standard", IEEE Transactions on Consumer Electronics, vol. 38, No. 1, Feb. 1992, pp. xviii-xxxiv.

Wu et al., "Machine Learning at Facebook: Understanding Inference at the Edge", In IEEE International Symposium on High Performance Computer Architecture (HPCA), 2019, 15 pages.

Yosinski et al., "Understanding Neural Networks Through Deep Visualization", Deep Learning Workshop, 31st International Conference on Machine Learning, pp. 1-12.

Yu et al., "Dilated Residual Networks", The IEEE Conference on Computer Vision and Pattern Recognition (CVPR), 2017, pp. 472-480.

Yu et al., "Multi-scale Context Aggregation by Dilated Convolutions", Published as a conference paper at ICLR 2016, Apr. 30, 2016, pp. 1-13.

Zhu et al., "Trained Ternary Quantization", Published as a conference paper at ICLR 2017, Feb. 23, 2017, pp. 1-10.

\* cited by examiner

IMAGE COMPRESSION WITH BOUNDED DEEP NEURAL NETWORK PERCEPTION LOSS

BACKGROUND

Computer vision based on deep neural networks (DNN) has lots of potential in the Internet of Things (IoT) regime with promising applications, such as object classification for a solar-powered wireless camera and/or object segmentation for a city-scale public-safety drone, etc. However, running DNN applications on IoT devices remains challenging due to the limited computing power, storage space, and/or battery life of the IoT devices. With the 5G network that features mobile edge computing, it is possible to offload inference tasks to powerful edge nodes. Thus, IoT devices can stream the captured video and/or image source to remote edge servers, which can then perform the compute-intensive DNN inference and respond with the results.

DNN-based inference at the edge has recently become a new frontier of deep learning research. However, considering the growing number of connected IoT devices, limited wireless bandwidth is becoming a fundamental challenge, hindering the deployment of the edge inference for DNN-based applications. Since DNNs are sensitive to input noise (for example, a single corrupted pixel may fool the DNN), IoT devices need to send high quality image and/or video to the edge for inference, causing scalability issues at wireless links. Therefore, source compression technique designed to facilitate the DNN inference at edge, which saves the bandwidth without compromising the DNN inference accuracy.

BRIEF DESCRIPTION OF THE DRAWINGS

The following detailed description references the drawings, wherein.

DETAILED DESCRIPTION

Neural networks generally refer to a set of algorithms, modeled after the human brain, that are designed to recognize patterns. They interpret sensory data through machine perception, labeling or clustering raw inputs. The patterns they recognize are numerical, contained in vectors, into which all real-world data, such as images, sound, text or time series, can be translated. Deep neural networks (DNNs) are neural networks involving a large number of layers.

IoT and deep-learning-based computer vision together create an immense market opportunity, but running deep neural networks (DNNs) on resource-constrained IoT devices remains challenging. Offloading DNN inference to an edge server is promising. However, limited wireless bandwidth bottlenecks its end-to-end performance and scalability. While IoT devices can adopt source compression to cope with the limited bandwidth, existing compression algorithms or codecs are often designed for the human vision system (HVS) rather than the DNNs, and thus suffer from either low compression ratios or high DNN inference errors.

This disclosure describes GRACE (GRAdient-driven Compression for Edge), a novel DNN-aware compression technique to facilitate the edge inference by significantly saving the network bandwidth without disturbing DNN's inference performance. Given a target DNN, GRACE can analyze this DNN's perception model with regard to both spatial frequencies and colors and generates an optimized compression strategy for the model via a one-time offline process. Then, GRACE can deploy this compression strategy at IoT devices to perform online source compression within the existing codec framework, adding no extra overhead.

In some examples, when the disclosed technique can be applied to the most popular image codec Joint Photographic Experts Group (JPEG), the evaluation results demonstrate its superior compression performance over existing strategies for key DNN applications. For semantic segmentation, this disclosed technique can reduce the image size by 23% compared to JPEG with similar interference accuracy. Further, the disclosed technique can achieve 7.5% higher accuracy over JPEG with a commonly used quality level of 75. For classification tasks, this invention can reduce the bandwidth consumption by 90% over JPEG with the same inference accuracy. Similarly, the disclosed technique can be widely used in compressing other image and/or video format such as H.264/MPEG-4 Advanced Video Coding (MPEG-4 AVC).

Figure 1:
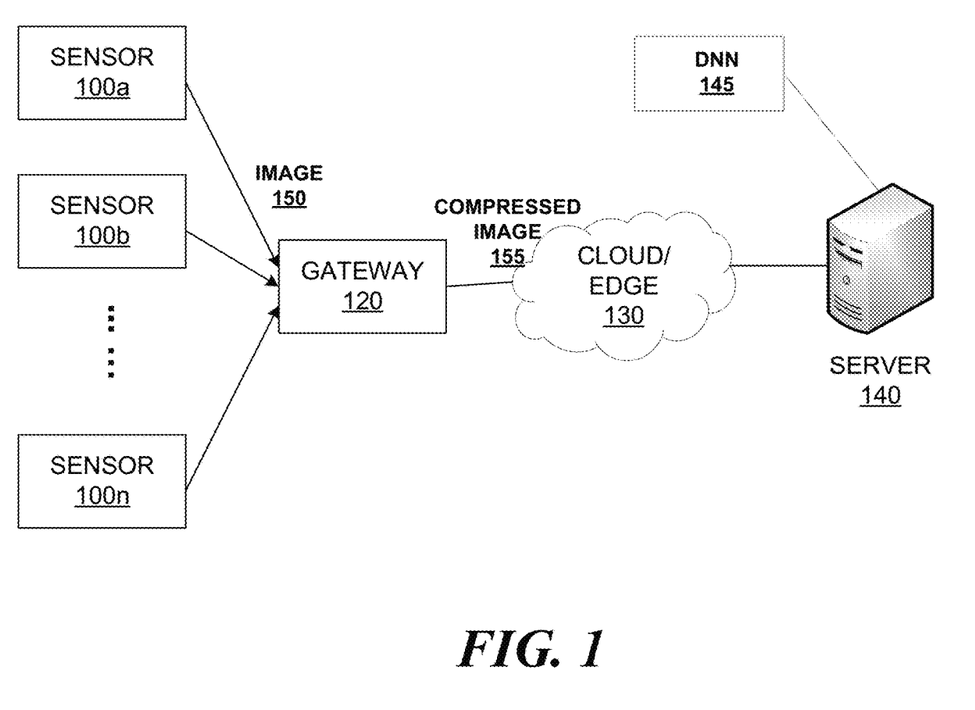
FIG. 1 illustrates an example computing environment for image compression with bounded deep neural network perception loss in accordance with the present disclosure.

FIG. 1 illustrates an example computing environment for image compression with bounded deep neural network perception loss. FIG. 1 includes a plurality of IoT devices, such as sensor 100a to sensor 100n, that are connected to a gateway device 120 deployed at the edge. The gateway device 120 may be communicatively coupled to at least a remote server 140 on cloud 130. For example, remote server 140 may be deployed at a data center on cloud 130. The plurality of IoT devices (e.g., sensors 100a to 100n) may transmit their captured images 500 to gateway device 120. To reduce the uplink bandwidth requirement of gateway device 120, gateway device 120 may compress the received images 150 locally at the edge, and then transmit the compressed images 155 to the remote server 140 on cloud 130. Server 140 can run a DNN 145 that analyzes the plurality of compressed images 155 received from gateway device 120.

Lossless image formats, such as BMP and PNG, have a too low compression ratio by natural, which hampers the scalability of edge inference architecture. In other words, those lossless image formats make it difficult for gateway device 120 to transmit a large quantity of images to server 140 for further processing.

On the other hand, lossy image formats designed for the human vision system (HVS), such as JPEG, are also unsuitable for the DNN inference. This is because such existing image and/or video compression is designed such that the human eyes cannot distinguish the difference between original and compressed image and/or video. Since a DNN's perception is very different from that of the HVS, the compression artifacts invisible to human vision system can cause a significant drop in the DNN inference accuracy. In other words, if gateway device 120 were to use JPEG to compress the images 150, the resulting compressed image 155 would have caused significant loss of accuracy in image perception by DNN 145 at server 140. Therefore, the present disclosure describes an enhanced image compression method and system with bounded deep neural network perception loss.

Figure 2A:
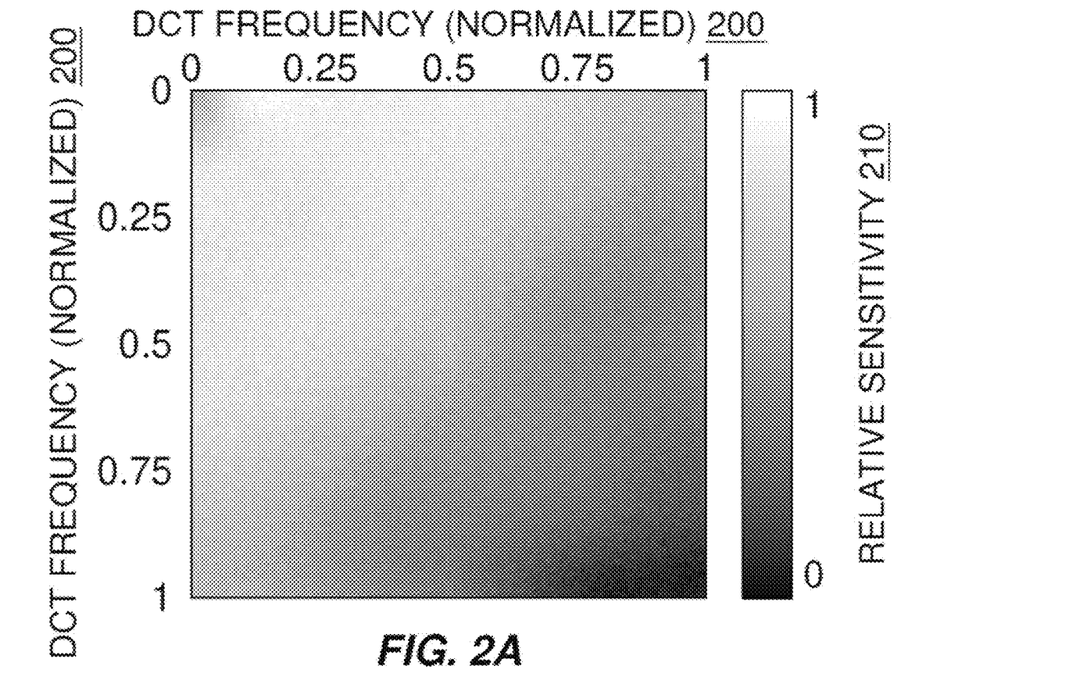
FIGS. 2A-2B illustrates example relative sensitivity of human vision system (HVS) versus deep neural network (DNN) in discrete cosine transform (DCT) frequency domains according to the present disclosure.
Figure 2B:
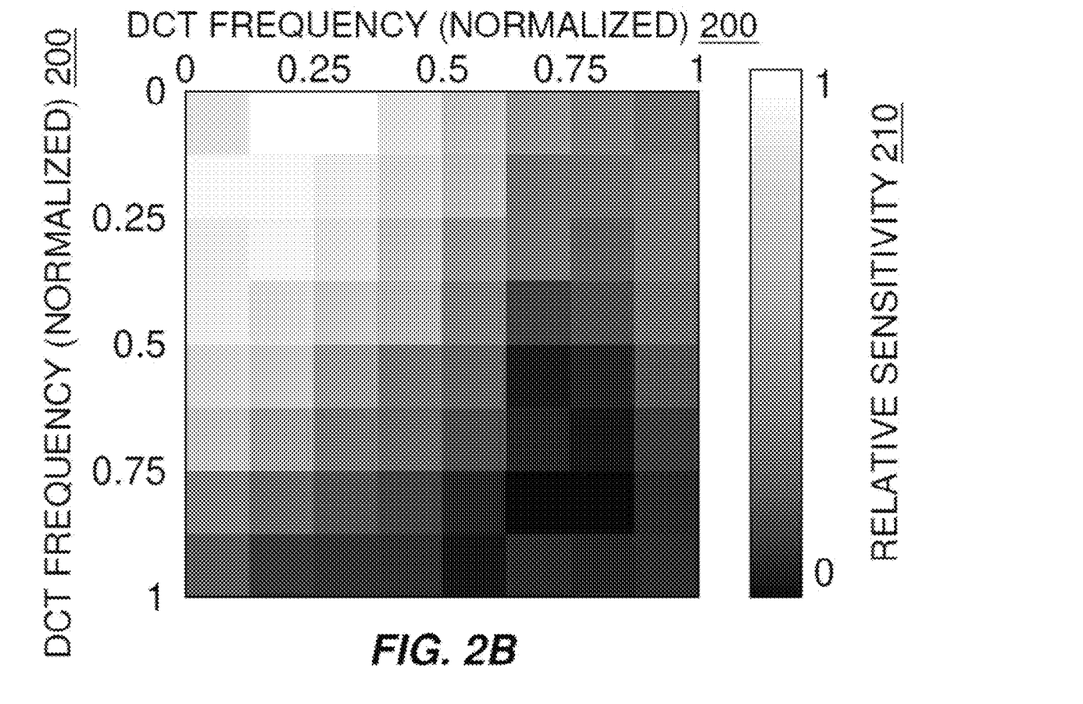

FIGS. 2A-2B illustrates example relative sensitivity of human vision system (HVS) versus deep neural network (DNN) in discrete cosine transform (DCT) frequency domains. Specifically, FIG. 2A illustrates example relative sensitivity of HVS estimated from a single or a set of images, whereas FIG. 2B illustrates relative sensitivity of DNN estimated from the same single or the same set of images. A DCT expresses a finite sequence of data points in terms of a sum of cosine functions oscillating at different frequencies.

High DCT frequency components in an image often correlate to the textures of the image. On the other hand, low DCT frequency components in the image often correlate to the outline of the image. Therefore, the DCT can facilitate the compression of the image by compressing the pixels where the target DNN has a relatively low sensitivity.

In an example where a single space domain image with 256×256 pixels is used, the DCT frequency 200 represents the frequency domain after converting from the space domain image by applying DCT to the space domain image. The legend relative sensitivity 210 represent whether the HVS or a target DNN is sensitive to a particular DCT frequency. In both FIGS. 2A and 2B, the top of the relative sensitivity bar 210 correlates to the upper left corner of the DCT frequency domain image, which correspond to the low DCT frequency and high sensitivity components in the test image(s). On the other hand, the bottom of the relative sensitivity bar 210 correlates to the lower right corner of the DCT frequency domain image, which correspond to the high DCT frequency and low sensitivity components in the test image(s).

Because human eyes are less sensitive compared to the DNN, the converted HVS DCT frequency domain image (shown in FIG. 2A) has reduced granularity compared to the converted DNN DCT frequency domain image (shown in FIG. 2B). In addition, the converted HVS DCT frequency domain image also has different distributions compared to the converted DNN DCT frequency domain image. For example, the converted DNN DCT frequency image has a larger area for highly sensitive DCT frequencies than the converted HVS DOT frequency domain. Image compression mechanisms that compress the components that HVS is not sensitive to but DNN is sensitive to will lead to perception loss when the image is analyzed by the DNN. Therefore, it is advantageous to base the compression mechanism on the DCT frequency domain derived from a target DNN running on the cloud server than derived from the HVS in order to improve the DNN inference accuracy.

In another example where a set of space domain images (e.g., 500 images) are used, the DOT frequency 200 represents the frequency domain after applying DCT to the set of space domain images to estimate the average DNN sensitivity of different DCT frequencies components in the set of images. Note that the HVS and target DNN have distinctly different DCT frequency domains. However, the DCT frequency domain for HVS (or DNN) does not vary much whether it is estimated from a few image or many different images.

On the other hand, different target DNNs may have their own unique DCT frequency domains when applying DOT to the same set of images. Specifically, given a test image x that is used to probe the target DNN's sensitivity with regard to the spatial frequencies, its spatial frequency representation $s=\{s_1, s_2, \ldots, s_N\}$ can be computed based on DCT, where $s_n$ denotes the value of a frequency coefficient. $\nabla_s L$ can be used to model the DNN's spatial-frequency perception. Note that most DNNs only takes the pixel representation of image x as the input. Thus, in order not to modify the DNN already deployed in the edge to take v as input, the following steps are used to compute $\nabla_s L$: (1) transform s to the pixels x using Inverse DCT (IDCT), (2) feed x to the DNN for inference and get loss L, (3) perform backward propagation through the DNN to measure the gradient $\nabla_x L$ with regard to the DNN's direct input x, (4) perform one more step of backward propagation through the IDCT (from x to s) to get $\nabla_s L$. Since we already know $\nabla_{x_i} L = \partial L / \partial x_i$ from the previous step, meanwhile $\partial x_i / \partial v_n$ for all $i \in [0, N]$ and $n \in [0, N]$ has been determined by the IDCT formula. Following the chain rule, we can compute $\partial L / \partial v_n$ for all $n \in [0, N]$. In this way, we obtain $\nabla_s L = g = \{g_1, g_2, \ldots, g_N\}$ of the compression target. After probing the target DNN with various test images and measuring the gradients $g_j$ for each image $x_j$, the system can average the measured gradients across all images, and use this mean gradient $g_m$ as the measure of the target DNN's sensitivity with regard to the spatial frequencies.

DNN inference accuracy can be measured by equation (1) below:

$$IoU = 100 \cdot N(t,p)/(N(t,p)+N(f,n)+N(f,p)) \quad (1)$$

For semantic segmentation, the inference accuracy is measured by the mean intersection over union (mIoU). For a certain class in the dataset, let N(t,p) denote the number of pixels that belong to this class and are predicted as this class (true-positive), N(f,n) denote the number of pixels that belong to this class but are predicted as a different class (false-negatives), N(f,p) denote the number of pixels that belong to a different class but are predicted as this class (false-positives). In general, DNN inference accuracy measures degree of overlap of DNN detected outline and human eye detected outline. Note that each class has its own IoU. The performance of DNN is the average IoU of all different classes.

Figure 3:
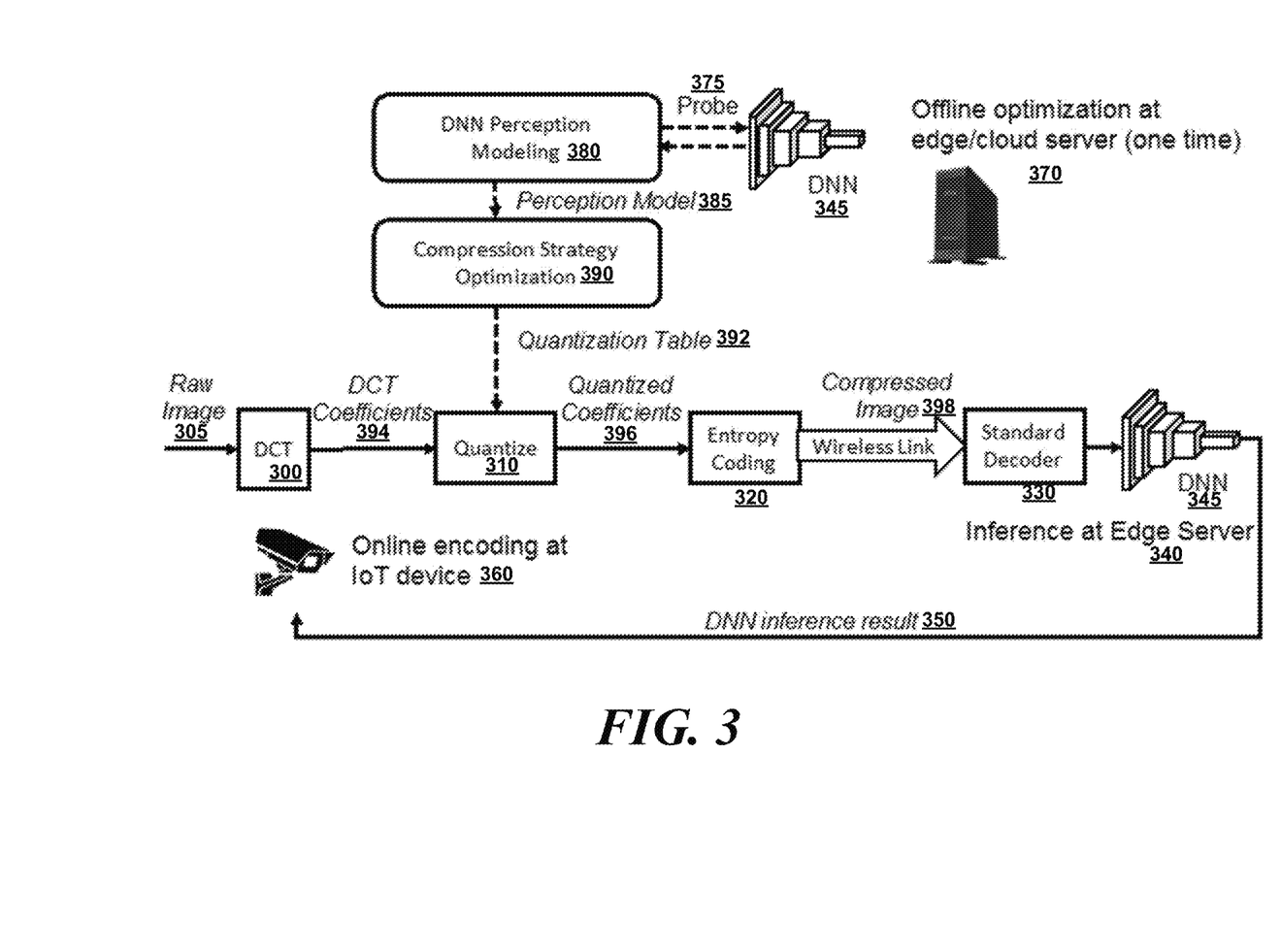
FIG. 3 illustrates an example system for image compression with bounded deep neural network perception loss according to the present disclosure.

FIG. 3 illustrates an example system for image compression with bounded deep neural network perception loss. The disclosed system involves a two-phase training process. The first phase involves offline training performed at a server 370 that can be deployed at either the edge or the cloud, During this phase, the system first performs DNN perception modeling 380 via a series of probes 375 to a target DNN 345. The probes 375 are performed offline prior to performing any real-time image compression on images received at the edge gateway device. To probe the target DNN 345, the system injects a small amount of noises to a test image to obtain an adversarial example, transmit the adversarial example in a probe message to a target DNN 345, and check the response from the target DNN 345 to determine whether DNN 345 can detect objects in the adversarial example with desired DNN inference accuracy.

Based on the target DNN's response to probe 375, the system can use backward propagation technique to derive a DNN perception model 385. After applying backward propagation to the DCT frequency domain for the target DNN, the system can obtain the importance level of different components of the image to the final result of image compression. Compressing a component of the image associated with a high importance level would reduce the DNN inference accuracy, whereas compressing a component of the image associated with a low importance level would not affect the DNN inference accuracy. In one example, the system uses a collection of approximately 15 images to probe the target DNN 345 to balance the accuracy and computing resource consumption.

Next, the system performs compression strategy optimization 390. In particular, the resulting DCT frequency domain image derived from the backward propagation can be used to derive the quantization table 392 by computing the gradient of DNN loss with respect to every DCT coefficient. In the quantization table 392 derived for the target DNN, the high sensitivity DCT frequency components correspond to a small quantization size in the quantization table. On the other hand, a low sensitivity DCT frequency components correspond to a large quantization size in the quantization table. The quantization size correlate to the amount of noise to be added to an image prior to compression. When the quantization size is small, less noise is added to the corresponding image component, resulting in less distortion after image compression. When the quantization size is large, more noise is added to the corresponding image component, resulting in more distortion after image compression. The derived quantization table specific to the target DNN is then used as optimization metrics for image compression for the target DNN, deployed to IoT devices (e.g., sensors at the edge) via the gateway device at the edge, and used for real-time image compression during the second phase.

Specifically, to derive the quantization table for a target DNN, consider a N-pixel image x (a random vector) as the DNN input. $s=\{s_1, \ldots, s_N\}$ denotes its DCT representation, and $q_n$ denotes the quantization step for the n-th frequency bin, then the quantization error $e_n = s_n - \lfloor s_n/q_n \rfloor$ and $\|e_n\| \leq q_n/2$. Since DCT concentrates energy on the low frequency, some high-frequency bins may have small $\|s_n\| \leq 2q_n$, where further increasing $q_n$ does not affect the quantization result. Thus, $q_n$ can be bounded by equation (2) without loss of the generality.

$$0 \leq q_n \leq 2\|s_n\| \qquad (2)$$

The disclosed system aims to generate the quantization table $T=\{q_1, \ldots, q_N\}$ given the measured gradient g with regard to the spatial frequencies, such that the file size is minimized, the quantization noise ($e_n$) only causes a small loss change ($g_n e_n$), and the sum loss change of the entire image is upperbounded by a constant shown in equation (3) below:

$$\min_q \Sigma_{n=1}^{N} \log_2 \left\| \frac{s_n}{q_n} \right\| \text{ s.t. } \Sigma_{n=1}^{N} g_n e_n \leq C \qquad (3)$$

Since the signs of $g_n$ and $e_n$ are random, in the worst case where they have the same sign that increases the loss, let $d_n = \|g_n\| \|g_n\|/2$ denote the loss increase. From equation (2) above, $d_n \leq \theta_n$ where $\theta_n = \|g_n s_n\|$ is the upperbound of the loss increase on the n-th frequency bin. To guarantee the worst-case DNN performance, the system can upperbound the total loss increase as $\Sigma_{n=1}^{N} d_n \leq B$, where the constant B is the upperbound of loss increase on each DCT block. Although the disclosed system aims to minimize the file size for a given B, the choice of upperbound value B may depend on various use cases. The role of B in GRACE is to control the size-accuracy tradeoff in the similar manner as the quality level in JPEG.

Given the target DNN's perception model, the optimization of the quantization table for the DCT coefficients can be summarized as the following steps:

(1) The system receives a chosen upper-bound or quota B for the DNN loss increase based on the desired use case scenario. This quota controls the balance between file size and DNN inference accuracy.

(2) Given the quota B of loss increase, the system evenly allocates the quota across all N DCT coefficients, i.e., compression on each DCT coefficient is allowed to cause a DNN loss increase $d_n$ of no more than B/N. According to the Arithmetic Mean-Geometric Mean (AM-GM) inequality, this achieves the optimal allocation that leads to the minimum file size.

(3) If any DCT coefficient has very low energy so that the worst-case loss increase $\theta$ caused by compression on this DCT coefficient is smaller than its allocated quota $d_n = B/N$, this DCT coefficient will be allocated a loss-increase quota $d_n$ that equals this worst-case loss increase $\theta_n$ (achieved when this DCT coefficient is quantized to 0), and the unused quota $B/N - \theta_n$ of this DCT coefficient is evenly reallocated to other DCT coefficients which already have $d_n \leq \theta_n$, and thus $d_n$ increases accordingly. The system repeats (1)-(3) until every DCT coefficient satisfies $d_n \leq \theta_n$.

(4) The system computes the upper-bound of the quantization noise $e_n$ on each DCT coefficient as its allocated quota $d_n$ of loss increase divided by the gradient amplitude $|g_n|$ of loss with respect to this DCT coefficient ($e_n = d_n/|g_n|$).

(5) The system computes the quantization step $q_n$ which is 2 times the upper-bound of the quantization noise ($q_n = 2e_n$) as rounding is used in the quantization. The quantization table $T=\{q_1, q_2, \ldots, q_N\}$ consists of the quantization step of all N DCT coefficients.

(6) The system sends the resulting quantization table T to the IoT devices via the edge gateway device.

The second phase of image compression training involves online training. With the optimized quantization table T received from the edge/cloud server, the IoT device performs the online compression of the DNN inputs before streaming them to the edge server. The image compression reuses the existing JPEG image encoder framework and sets the quantization table to the one optimized for the target DNN.

During this second phase, raw image (or video) 305 of n×n pixels are sent as input to DCT module 300 from IoT devices. DCT module 300 decomposes of the n×n unique two-dimensional spatial frequencies, which comprise the input signal's spectrum. The ouput of the DCT is the set of n×n basis-signal amplitudes (also referred to as DCT coefficients 394).

To achieve further compression, each DCT coefficient is uniformly quantized at a quantize module 310 in conjunction with an n×n size quantization table. Quatization is defined as division of each DCT coefficient by its corresponding quantizer step size, followed by rounding to the nearest integer, and then the output is normalized by the quantizer step size. Rather than using a fixed JPEG quantization table, the system uses the deployed quantization table 392, which is derived from the offline training process and optimized for the target DNN 345 given a predefined upper bound B. The quantize module 310 produces a plurality of quantized coefficients 396 that are sent to an entropy encoding module 320.

Next, the entropy encoding module 320 performs entropy coding. In general, entropy encoding can be performed as a 2-step process. The first step converts the zig-zag sequence of quantized coefficients into an intermediate sequence of symbols. The second step converts the symbols to a data stream in which the symbols no longer have externally identifiable boundaries. The form and definition of the intermediate symbols is dependent on both the DCT-based mode of operation and the entropy coding method.

The entropy encoding module 320 can produce the compressed image 398, which are transmitted to an edge server (e.g., the gateway device). The edge server can use a standard decoder 330 to decode the compressed image 398 and perform DNN inference at edge server 340. Here, the edge server 340 runs an instance of target DNN 345 that the quantization table 392 is optimized for. The edge server can then send the DNN inference result 350 to the IoT device 360 that is performing online encoding at the edge. In some examples, the server running the instance of DNN 345 can be deployed on the cloud rather than at the edge.

The disclosed system provides a variety of benefits. First, it provides guaranteed DNN inference accuracy with high compression ratio. Based on the relation between the DNN loss and its gradient, the disclosed system minimizes the file size under a configurable upper-bound of the DNN loss increase. For classification tasks, the disclosed system can reduce the bandwidth consumption by 90% over JPEG with the same inference accuracy. This described technique provides a guarantee for the DNN inference accuracy, and the users can manually configure the trade-off between the file size and DNN inference accuracy for the desired applications.

Second, the disclosed system does not change the running overhead compared to JPEG. The disclosed system performs the DNN perception modeling and compression strategy optimization in an offline process, which can be executed in advance on a remote server. Further, the online compression reuses existing JPEG codec framework with the optimized compression strategy as the configurable codec parameters (e.g., quantization table), adding no extra computation overhead.

Third, the disclosed system is backward compatible. Since the JPEG encoder embeds the quantization table in the image file itself, by reusing the JPEG codec framework, the resulting image files contain the quantization table optimized for DNN, and any unmodified JPEG decoder can decode them.

Last but not least, the disclosed system models a DNN's sensitivity to different frequency components by its gradients, and then optimizes the compression strategy accordingly. This approach is not limited to image compression and has broad applications in various video or audio compression cases.

Figure 4:
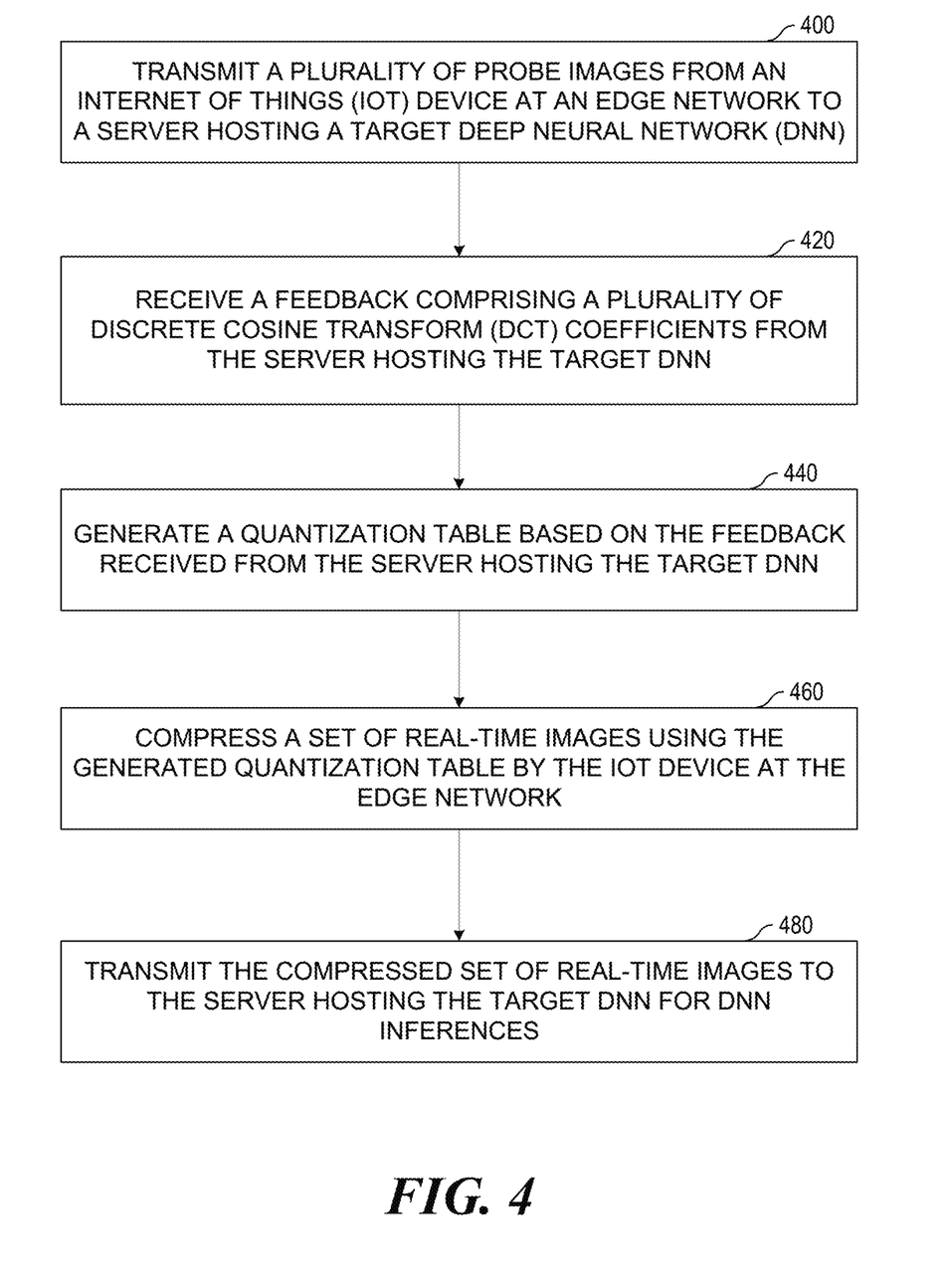
FIG. 4 is an example process of image compression with bounded deep neural network perception loss according to the present disclosure.

FIG. 4 is an example process of image compression with bounded deep neural network perception loss according to the present disclosure. During operations, a network device may transmit a plurality of probe images from an IoT device at an edge network to a server hosting a target DNN (operation 400). The plurality of images are injected with a limited amount of noise. Then, the network device may receive a feedback comprising a plurality of DCT coefficients from the server hosting the target DNN (operation 420). Here, the plurality of DCT coefficients are unique to the target DNN, Further, the network device may generate a quantization table based on the feedback received from the server hosting the target DNN (operation 440). Then, the network device can compress a set of real-time images using the generated quantization table by the IoT device at the edge network (operation 460). Subsequently, the network device can transmit the compressed set of real-time images to the server hosting the target DNN for DNN inferences (operation 480).

In some examples, the plurality of DCT coefficient may indicate the DCT frequency domain sensitivity corresponding to the target DNN.

In some examples, the network device may convert the plurality of probe images from a spatial domain to a frequency domain prior to transmitting the plurality of probe images from the IoT device to the server hosting the target DNN.

Furthermore, in some examples, the network device can receive an upper bound quota for loss increase associated with the target DNN. The upper bound controls balance between file size and inference accuracy of the target DNN. The network device can then allocate the upper bound quota evenly among the plurality of DCT coefficients. Moreover, the network device can compute a corresponding upper bound of quantization noise on each of the plurality of DCT coefficients. Then, the network device can generate the quantization table based on the corresponding upper bound of quantization noise on each DCT coefficient.

In some examples, the corresponding upper bound of the quantization noise on each of the plurality of DCT coefficients is computed by the network device as allocated upper bound quota of loss increase divided by a gradient of loss with respect to each DCT coefficient.

In some examples, the network device can estimate the gradient of loss with respect to each DCT coefficient by performing backward propagation of loss.

In some examples, the quantization table can be generated during an offline phase when the IoT device is not concurrently performing real-time compression of the set of images at the edge network.

In some examples, the network device applies DCT on a live image by the IoT device to generate a plurality of DCT coefficient. Then, the network device use the quantization table that is unique to the target DNN to generate quantized coefficients. Further, the network device performs entropy coding on the quantized coefficient to produce compressed image that are sensitive to the target DNN.

Figure 5:
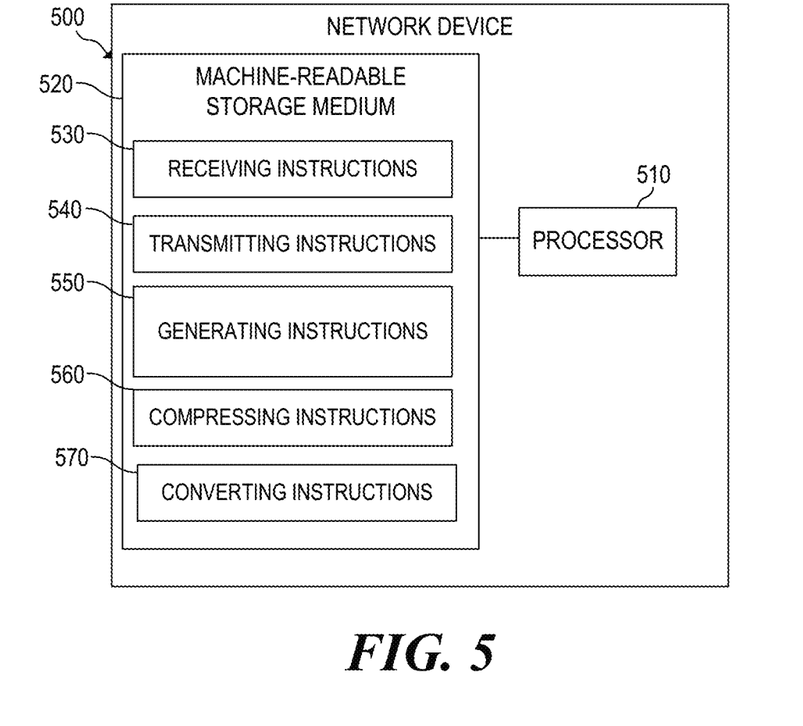
FIG. 5 is a block diagram of an example network device to perform image compression with bounded deep neural network perception loss according to the present disclosure.

FIG. 5 is a block diagram of an example network device to perform image compression with bounded deep neural network perception loss according to the present disclosure.

As used herein, a network device may be implemented, at least in part, by a combination of hardware and programming. For example, the hardware may comprise at least one processor (e.g., processor 510 which may include one main processor and a plurality of co-processors) and the programming may comprise instructions, executable by the processor(s), stored on at least one machine-readable storage medium (e.g., 520). In addition, a network device may also include embedded memory and a software that can be executed in a host system and serve as a driver of the embedded memory. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof.

The at least one processor 510 may fetch, decode, and execute instructions stored on storage medium 520 to perform the functionalities described below in relation to receiving instructions 530, transmitting instructions 540, generating instructions 550, compressing instructions 560, and converting instructions 570. In other examples, the functionalities of any of the instructions of storage medium 520 may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the example of FIG. 5, storage medium 520 may be implemented by one machine-readable storage medium, or multiple machine-readable storage media.

Although network device 500 includes at least one processor 510 and machine-readable storage medium 520, it may also include other suitable components, such as additional processing component(s) (e.g., processor(s), ASIC(s), etc.), storage (e.g., storage drive(s), etc.), or a combination thereof.

As used herein, a "machine-readable storage medium" may be any electronic, magnetic, optical, or other physical storage apparatus to contain or store information such as executable instructions, data, and the like. For example, any machine-readable storage medium described herein may be any of Random Access Memory (RAM), volatile memory, non-volatile memory, flash memory, a storage drive (e.g., a hard drive), a solid state drive, any type of storage disc (e.g., a compact disc, a DVD, etc.), and the like, or a combination thereof. Further, any machine-readable storage medium described herein may be non-transitory. In examples described herein, a machine-readable storage medium or media may be part of an article (or article of manufacture). An article or article of manufacture may refer to any manufactured single component or multiple components.

Specifically, instructions 530-570 may be executed by processor 510 to: transmit a plurality of probe images from an Internet of Things (IoT) device at an edge network to a server hosting a target deep neural network (DNN), wherein the plurality of images are injected with a limited amount of noise; receive a feedback comprising a plurality of discrete cosine transform (DCT) coefficients from the server hosting the target DNN, wherein the plurality of DCT coefficients are unique to the target DNN; generate a quantization table based on the feedback received from the server hosting the target DNN; compress a set of real-time images using the generated quantization table by the IoT device at the edge network; transmit the compressed set of real-time images to the server hosting the target DNN for DNN inferences; convert the plurality of probe images from a spatial domain to a frequency domain prior to transmitting the plurality of probe images from the IoT device to the server hosting the target DNN; receive an upper bound quota for loss increase associated with the target DNN, wherein the upper bound controls balance between file size and inference accuracy of the target DNN; allocate the upper bound quota evenly among the plurality of DCT coefficients; compute a corresponding upper bound of quantization noise on each of the plurality of DCT coefficients; generate the quantization table based on the corresponding upper bound of quantization noise on each DCT coefficient; estimate the gradient of loss with respect to each DCT coefficient by performing backward propagation of loss; apply DCT on a live image by the IoT device to generate a plurality of DCT coefficient; use the quantization table to generate quantized coefficients; perform entropy coding on the quantized coefficient to produce compressed image that are sensitive to the target DNN; etc.

We claim:

1. A method comprising:
   transmitting a plurality of probe images from an Internet of Things (IoT) device at an edge network to a server hosting a target deep neural network (DNN), wherein the plurality of images are injected with a limited amount of noise;
   receiving a feedback comprising a plurality of discrete cosine transform (DCT) coefficients from the server hosting the target DNN, wherein the plurality of DCT coefficients are unique to the target DNN;
   generating a quantization table based on the feedback received from the server hosting the target DNN;
   compressing a set of real-time images using the generated quantization table by the IoT device at the edge network; and
   transmitting the compressed set of real-time images to the server hosting the target DNN for DNN inferences.

2. The method of claim 1, wherein the plurality of DCT coefficient indicates the DCT frequency domain sensitivity corresponding to the target DNN.

3. The method of claim 1, further comprising:
   converting the plurality of probe images from a spatial domain to a frequency domain prior to transmitting the plurality of probe images from the IoT device to the server hosting the target DNN.

4. The method of claim 1, further comprising:
   receiving an upper bound quota for loss increase associated with the target DNN, wherein the upper bound controls balance between file size and inference accuracy of the target DNN;
   allocating the upper bound quota evenly among the plurality of DCT coefficients;
   computing a corresponding upper bound of quantization noise on each of the plurality of DCT coefficients; and
   generating the quantization table based on the corresponding upper bound of quantization noise on each DCT coefficient.

5. The method of claim 4, wherein the corresponding upper bound of the quantization noise on each of the plurality of DCT coefficients is computed as allocated upper bound quota of loss increase divided by a gradient of loss with respect to each DCT coefficient.

6. The method of claim 5, further comprising:
   estimating the gradient of loss with respect to each DCT coefficient by performing backward propagation of loss.

7. The method of claim 1, wherein the quantization table is generated during an offline phase when the IoT device is not concurrently performing real-time compression of the set of images at the edge network.

8. The method of claim 1, wherein using the generated quantization table to perform the real-time compression of images captured by the IoT device at the edge network further comprises:
   applying DCT on a live image by the IoT device to generate a plurality of DCT coefficient;
   using the quantization table to generate quantized coefficients; and
   performing entropy coding on the quantized coefficient to produce compressed image that are sensitive to the target DNN.

9. A network device comprising at least:
   a memory;
   a processor executing instructions in the memory to:
   transmit a plurality of probe images from an Internet of Things (IoT) device at an edge network to a server hosting a target deep neural network (DNN), wherein the plurality of images are injected with a limited amount of noise;

receive a feedback comprising a plurality of discrete cosine transform (DCT) coefficients from the server hosting the target DNN, wherein the plurality of DCT coefficients are unique to the target DNN;

generate a quantization table based on the feedback received from the server hosting the target DNN;

compress a set of real-time images using the generated quantization table by the IoT device at the edge network; and transmit the compressed set of real-time images to the server hosting the target DNN for DNN inferences.

10. The network device of claim 9, wherein the plurality of DCT coefficient indicates the DCT frequency domain sensitivity corresponding to the target DNN.

11. The network device of claim 9, wherein the processor further executes the instructions in the memory to:

convert the plurality of probe images from a spatial domain to a frequency domain prior to transmitting the plurality of probe images from the IoT device to the server hosting the target DNN.

12. The network device of claim 9, wherein the processor further executes the instructions in the memory to:

receive an upper bound quota for loss increase associated with the target DNN, wherein the upper bound controls balance between file size and inference accuracy of the target DNN;

allocate the upper bound quota evenly among the plurality of DCT coefficients;

compute a corresponding upper bound of quantization noise on each of the plurality of DCT coefficients; and generate the quantization table based on the corresponding upper bound of quantization noise on each DCT coefficient.

13. The network device of claim 12, wherein the corresponding upper bound of the quantization noise on each of the plurality of DCT coefficients is computed as allocated upper bound quota of loss increase divided by a gradient of loss with respect to each DCT coefficient.

14. The network device of claim 13, wherein the processor further executes the instructions in the memory to:

estimate the gradient of loss with respect to each DCT coefficient by performing backward propagation of loss.

15. The network device of claim 9, wherein the quantization table is generated during an offline phase when the IoT device is not concurrently performing real-time compression of the set of images at the edge network.

16. The network device of claim 9, wherein the processor further executes the instructions in the memory to:

apply DCT on a live image by the IoT device to generate a plurality of DCT coefficient;

use the quantization table to generate quantized coefficients; and perform entropy coding on the quantized coefficient to produce compressed image that are sensitive to the target DNN.

17. A non-transitory machine-readable storage medium encoded with instructions executable by a processor of a computing device, the non-transitory machine-readable storage medium comprising instructions to:

transmit a plurality of probe images from an Internet of Things (IoT) device at an edge network to a server hosting a target deep neural network (DNN), wherein the plurality of images are injected with a limited amount of noise;

receive a feedback comprising a plurality of discrete cosine transform (DCT) coefficients from the server hosting the target DNN, wherein the plurality of DCT coefficients are unique to the target DNN;

generate a quantization table based on the feedback received from the server hosting the target DNN;

compress a set of real-time images using the generated quantization table by the IoT device at the edge network; and transmit the compressed set of real-time images to the server hosting the target DNN for DNN inferences.

18. The non-transitory machine-readable storage medium of claim 17, further comprising instructions to:

receive an upper bound quota for loss increase associated with the target DNN, wherein the upper bound controls balance between file size and inference accuracy of the target DNN;

allocate the upper bound quota evenly among the plurality of DCT coefficients;

compute a corresponding upper bound of quantization noise on each of the plurality of DCT coefficients; and generate the quantization table based on the corresponding upper bound of quantization noise on each DCT coefficient.

19. The non-transitory machine-readable storage medium of claim 17, further comprising instructions to:

apply DCT on a live image by the IoT device to generate a plurality of DCT coefficient;

use the quantization table to generate quantized coefficients; and perform entropy coding on the quantized coefficient to produce compressed image that are sensitive to the target DNN.

20. The non-transitory machine-readable storage medium of claim 17, wherein the quantization table is generated during an offline phase when the IoT device is not concurrently performing real-time compression of the set of images at the edge network.

* * * * *